June 4, 1968  D. OLIVA  3,387,259
CAR THEFT INHIBITOR
Filed July 2, 1965  3 Sheets-Sheet 2
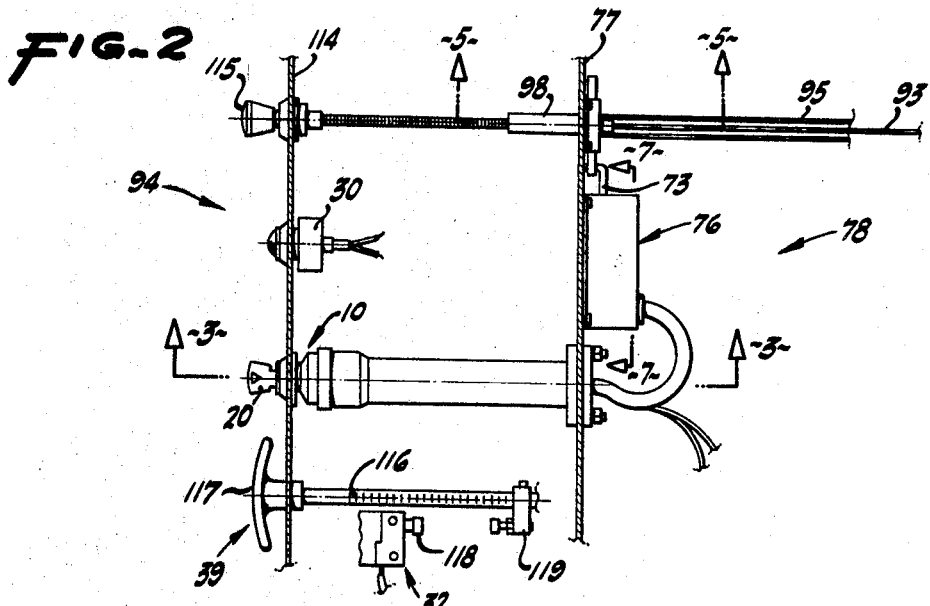
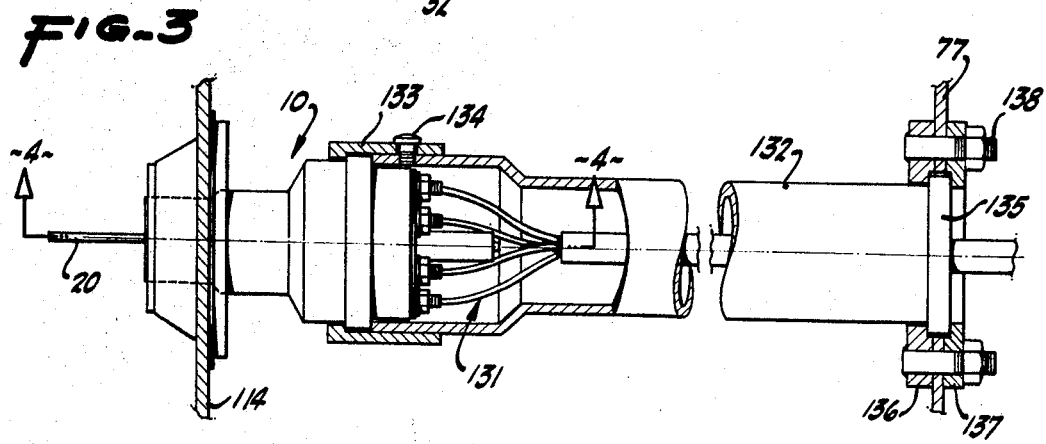
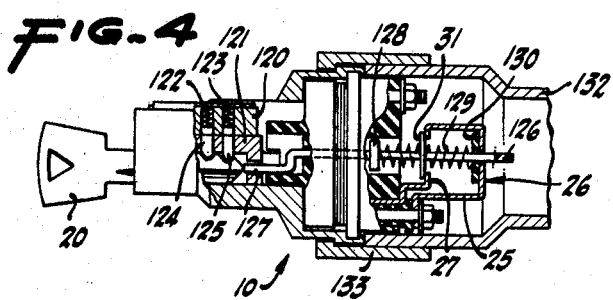
INVENTOR.
DOMENIC OLIVA
BY
Stanley Bialos
ATTORNEY

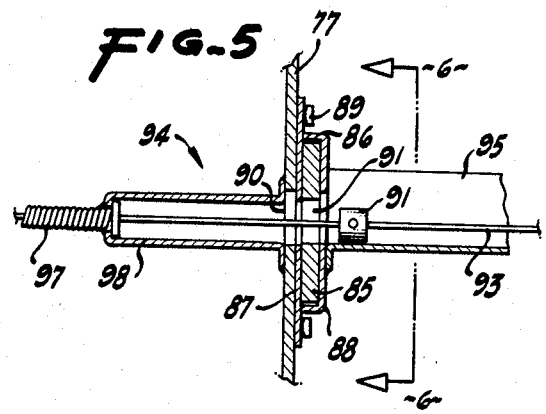
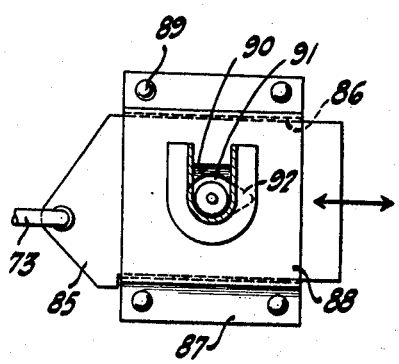
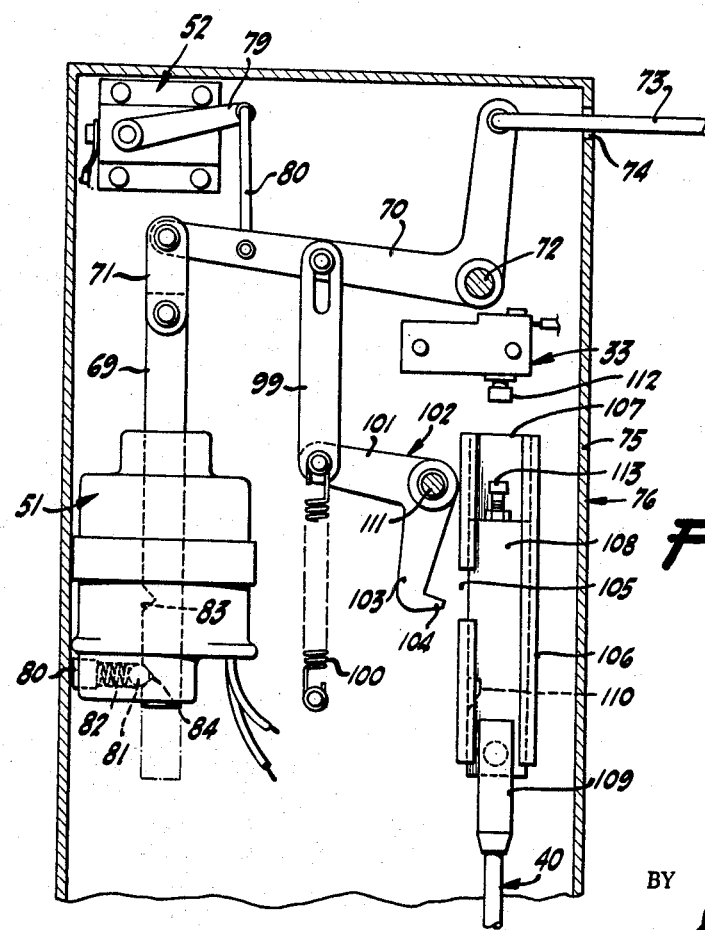

United States Patent Office 3,387,259
Patented June 4, 1968

3,387,259
CAR THEFT INHIBITOR
Domenic Oliva, San Francisco, Calif., assignor to
Albert A. Oliva, Wood River, Ill.
Filed July 2, 1965, Ser. No. 469,135
18 Claims. (Cl. 340—64)

ABSTRACT OF THE DISCLOSURE

A car theft inhibitor for minimizing human inadvertence and carelessness when parking and leaving an automobile often leading to accidents involving the same or to theft or other unauthorized use thereof. The inhibition provided is effected by alerting the driver of an automobile to the fact that certain protective conditions have not been satisfied as he is about to leave the automobile after parking the same. The inhibitor provides a signal system, including both audible and visible indicia, which alerts the driver to the fact that one or more of the protective conditions have not been met and which conditions include actuation of the parking brake, removal of the ignition key from the lock-equipped ignition switch, and placement of the gear shift in the park position thereof; the provision of a tamper-proof arrangement for protecting the ignition wires; and a lock that prevents entry into the engine compartment through the movable hood closure therefor when the ignition switch is in the "off" position and the key removed from the lock section thereof.

---

This invention relates to a system for minimizing human inadvertence when parking and leaving an automobile, which inadvertence often leads to accidents involving the automobile and to theft or other unauthorized use thereof. The invention relates more particularly to a system for alerting the driver of an automobile to the fact that certain conditions have not been satisfied as he is about to leave the automobile after parking the same, which unfulfilled conditions could lead to theft of the automobile or to a runaway condition thereof especially in hilly terrain.

Locks and other anti-theft devices have long been used in and about automobiles to prevent theft and other unauthorized use thereof. For example, in addition to the well known ignition lock and door locks, signal systems have been proposed which provide an audible alarm whenever an automobile is moved without the ignition thereof being properly operated. Also, a combination of locks respectively controlling various components of an automobile have been proposed, such as an ignition lock associated with the steering column which prevents steering of the automobile unless the ignition lock has first been released by insertion and manipulation of the key therefor. Somewhat analogous arrangements which tend to stress safety rather than unauthorized use have also been suggested as, for example, an arrangement operative to shift automatically the transmission of an automobile into the neutral position thereof whenever the door of the automobile is opened.

The present invention has as its objects, among others: an improved safety and anti car-theft system; an improved system of the character described in which a plurality of conditions must be satisfied before the driver leaves the automobile or otherwise a signal system alerts him to the fact that one or more of such conditions have not been met; a signal system that provides both audible and visual indicia as to the absence of complete satisfaction of such conditions; a signal system as described in which such conditions include actuation of the parking brake, removal of the ignition key, and placement of the gear shift in the park position thereof; a substantially tamper-proof arrangement for protecting the ignition wires to prevent unauthorized bypassing of the key-actuated ignition switch; and a lock that prevents entry into the engine compartment through the movable hood closure therefor when the ignition switch is in the "off" position and the key removed from the lock section thereof.

Additional objects and advantages, particularly of a specific character, will become apparent as the specification develops.

An embodiment of the invention is illustrated in the accompanying drawings in which:

FIGURE 2 is a broken, longitudinal sectional view showing a portion of the dashboard and fire wall of such automobile;

FIGURE 3 is an enlarged, broken, longitudinal sectional view taken along the line 3—3 of FIGURE 2;

FIGURE 4 is a broken, longitudinal sectional view taken along the line 4—4 of FIGURE 3;

FIGURE 5 is an enlarged, broken, longitudinal sectional view taken along the line 5—5 of FIGURE 2;

FIGURE 6 is a vertical sectional view taken along the line 6—6 of FIGURE 5; and

FIGURE 7 is an enlarged, transverse sectional view taken along the line 7—7 of FIGURE 2.

Figure 1:
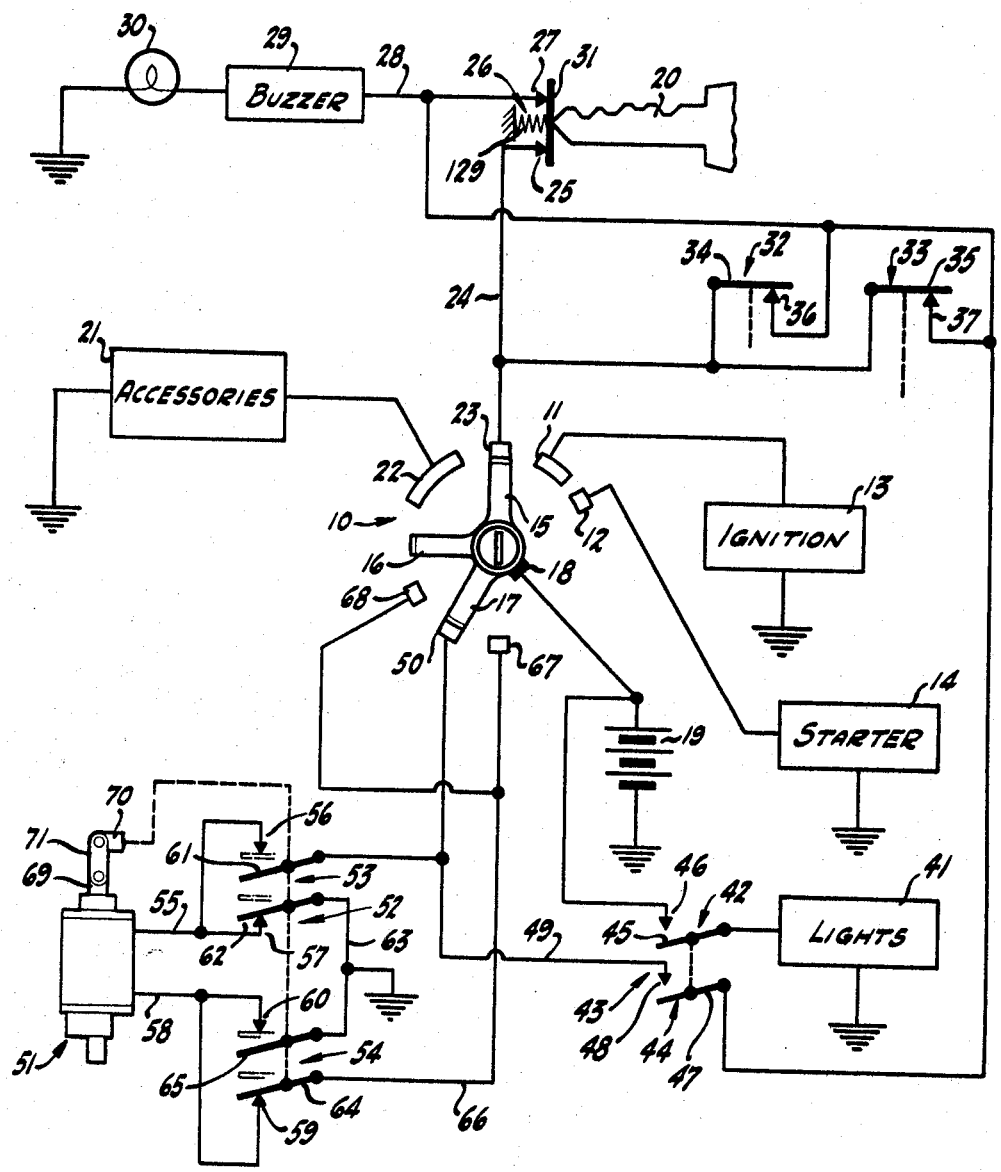
FIGURE 1 is a schematic diagram of a portion of the electrical system of an automobile embodying the invention.

The system has as its nucleus the automobile ignition switch which, in FIGURE 1, is designated in its entirety with the numeral 10. The switch 10 to a great extent is conventional and, as such, includes an ignition contact 11 and a starter contact 12. The contact 11 connects with the ignition circuit, generally denoted by the block 13, which circuit is grounded to the chassis of the automobile in the conventional manner. Similarly, the contact 12 is connected to the starter 14 which is also grounded to the chassis.

The switch 10 has a movable contact comprising a plurality of arms 15, 16 and 17 which are conjointly connected electrically through a connector arm 18 to one side of the automobile battery 19. The opposite side of the battery 19 is grounded, and while in the specific system illustrated the negative side of the battery is connected to ground, it will be appreciated that the positive side of the battery could constitute the ground as is the case in certain makes of automobiles.

The movable contact of the ignition switch 10 can be rotated whenever the ignition key 20 is properly inserted thereinto. If the contact is rotated in a clockwise direction, as viewed in FIGURE 1, the arm 15 will first engage the contact 11 defining the "on" position of the ignition switch and through which the ignition circuit 13 is energized. Further rotation of the contact in the same direction brings the arm 15 into engagement with both the contacts 11 and 12 whereupon the starter 14 is energized. As is well known, the movable contact is resiliently biased in a counter-clockwise direction when in the "start" position, which biasing force tends to return the contact to the "on" position thereby preventing continued actuation of the starter 14 after the engine has been started and the manual grip on the key released.

Whenever the arm 16 of the movable contact is displaced angularly in a clockwise direction, the arm 15 is displaced therewith in such direction whereupon the various accessories, indicated generally by the numeral 21 and usually including the radio and heater, can be energized because of the engagement of the arm 16 with switch contact 22. If the movable contact of the switch 10 is rotated in a counter-clockwise direction into the "accessory" position defined by the contact 22, the arm 15 will engage such contact whereupon the accessories can be energized. With the switch in the "off" position shown in FIGURE 1, the starter, ignition circuit, and accessories cannot be energized. Accordingly, so far as described, the switch 10 performs the functions of the conventional automobile ignition switch and in precisely the same manner.

The switch 10 is provided at the "off" position thereof with a stationary contact 23, and connected with this contact through a conductor 24 is a fixed terminal 25 of a key-actuated switch generally denoted as 26. The switch 26 (which comprises a physical part of the switch 10, as will be described hereinafter) has a second fixed contact 27 connected by a conductor 28 to one side of a buzzer or other audible signal device 29 having connected in series therewith one side of a light or visual indicia device 30, the opposite side of which is grounded. The switch 26 further includes a movable contact 31 resiliently biased toward the right, as viewed in FIGURE 1, or away from the stationary terminals 25 and 27. The contact 31 is displaced into engagement with such terminals 25 and 27, to complete a circuit therebetween, by the key 20 whenever it is inserted to its full extent into the lock section of the switch 10. As shown in FIGURE 4, and as will be described subsequently, the movable contact 31 comprises a conductor adapted to bridge the terminals 25 and 27, and although displaced by the key 20, it is electrically isolated therefrom.

It will be evident that when the switch 10 is in the "off" position illustrated in FIGURE 1, a circuit through the serially connected audible and visual indicators 29 and 30 will be completed whenever the key 20 is located within the lock position of the switch. Such completed circuit includes the battery 19, connector 18, arm 15, contact 23, conductor 24, switch contact 31, and terminals 25 and 27, and conductor 28. Should the switch 10 be rotated in either a clockwise or counter-clockwise direction to displace the arm 15 from the contact 23, the circuit through the indicia devices 29 and 30 will be interrupted. Similarly, if the switch 10 is in the "off" position illustrated, the indicia circuit through the switch 26 will be interrupted if the key 20 is withdrawn from the ignition switch. It should be noted that the key 20 and the switch 26 are illustrated in FIGURE 1 as being disassociated from the ignition switch 10, but again it should be noted that such disassociation is for illustrative purposes only and the switch 26 actually comprises a part of the ignition switch unit and is closed whenever the ignition key 20 is inserted into the lock section of such switch.

Connected in parallel with each other and with the switch 26 are a pair of switches generally denoted 32 and 33. In this respect, the switches 32 and 33 are equipped with movable contacts 34 and 35, respectively, which are connected in common with the terminal 25 of the switch 26 to the contact 23 of the switch 10. The switches 32 and 33 are also equipped with stationary contacts or terminals 36 and 37, respectively, which are connected to the conductor 28 in common with the terminal 27 of the switch 26. Thus, whenever the switch 10 is in the "off" position thereof, as illustrated in FIGURE 1, the audible and visual indicia devices 29 and 30 can be energized through either of the switches 32 and 33.

These switches 32 and 33 are respectively associated with the parking brake actuator 39 (FIGURE 2) and gear shift lever 40 (FIGURE 7) and are closed unless, in the case of the switch 32, the parking brake actuator 39 is in the "park" position thereof and, in the case of the switch 33, the transmission and its gear shift lever 40 are in their "park" position. Thus, when the ignition switch 10 is "off," the indicia devices will be energized unless both the brake and transmission are in the "park" positions thereof.

The electrical circuit depicted in FIGURE 1 also includes the usual driving lights, indicated in their entirety by the block 41. One side of the lighting circuit is grounded, and the other side is connected to one pole or unit 42 of a double-pole single-throw switch 43 which also includes a second pole or unit 44. The movable contact 45 of the switch unit 44 is connected to the light circuit 41, and the stationary terminal 46 of such switch unit is connected to the positive side of the battery 19. Thus, the lighting circuit 41 can be controlled in the conventional manner simply by selectively moving the switch 43 between the open position thereof, shown in FIGURE 1, and the closed position thereof in which the contact 45 will be in engagement with the terminal 46 of the switch unit 42.

Quite frequently the driving lights of an automobile are inadvertently left in the energized state thereof when the driver leaves the car. This occurrence is obviated when the present invention is utilized because the audible and visual indicia devices are energized to alert the driver whenever the driving lights are on and the ignition switch 10 is turned to its "off" position. More particularly, the switch unit 44 is seen to have a movable contact 47 connected to the conductor 28 and, thereby, to one side of the buzzer 29. The switch unit 44 also has a fixed terminal 48 connected by a conductor 49 to a contact 50 provided by the ignition switch 10. In the position shown in which the ignition switch 10 is "off," the arm 17 of the movable contact is in engagement with the terminal 50. Accordingly, the audible and visual indicia devices 29 and 30 will be energized, if the switch 43 is closed to energize the light circuit 41, through the circuit including the battery 19, connector 18, arm 17, conductor 49, switch unit 44 and conductor 28.

The system also includes an arrangement for automatically locking the hood of the engine compartment in its closed position whenever the ignition switch 10 is "off" and also for locking the transmission and gear shift lever 40 thereof in the park position whenever it is moved thereinto and the ignition switch 10 is off. Such arrangement includes a solenoid 51 the energizing circuit of which is controlled through a switch, generally denoted with the numeral 52.

The switch 52 includes two double pole switch units 53 and 54; and one side of the energizing coil of the solenoid is connected through a conductor 55 to the two fixed terminals 56 and 57 of the switch unit 53, and the opposite side of the energizing coil is connected through a conductor 58 to the two fixed terminals 59 and 60 of the switch unit 54. The switch unit 53 has two movable contacts 61 and 62, the first of which is connected to the aforementioned conductor 49 and, thereby, to the contact 50 of the ignition switch 10. The second contact 62 is grounded through a conductor 63. In a somewhat analogous manner, the switch unit 54 has a pair of movable contacts 64 and 65, the last of which is grounded through the conductor 63 and the first of which is connected through a conductor 66 to a pair of fixed contacts 67 and 68 that are provided by the ignition switch 10.

The solenoid 51 has a plunger 69 (see also FIGURE 7) pivotally connected to one arm of a bell crank 70 through a bifurcated linkage 71. The bell crank 70 is pivotally supported intermediate the ends thereof upon a pivot pin 72, and its second arm is pivotally connected to a latch rod 73 that is used to secure the hood of the automobile in its closed position whenever the ignition switch 10 is turned off, as will be described in detail hereinafter. The latch rod 73 extends through an opening 74 provided therefor in the side wall 75 of a casing 76 which is bolted or otherwise fixedly mounted upon the forward side of the fire wall 77 (FIGURE 2) of the automobile within the engine compartment thereof generally denoted 78. As is shown best in FIGURE 7, the solenoid 51 is mounted within the casing 76 as is the switch 52.

The switch 72 is provided with an actuator arm 79 that controls the position of the movable contacts 61 and 62, 64 and 65 thereof. The actuator arm is connected with the bell crank 70 through a link 80 which at one end is connected to the bell crank and at its other end is connected to the actuator arm. Evidently, the position of the actuator arm 79, and consequently the position of the movable contacts of the switch 52, is determined by the position of the solenoid plunger 69 which is reciprocable along the longitudinal axis thereof between an uppermost position illustrated in FIGURE 7 (which uppermost position corresponds to both the "on" and "accessory" positions of the ignition switch 10), and a lowermost position shown in FIGURE 1 (which lowermost position corresponds to the "off" position of the ignition switch 10). The plunger 69 may be yieldably constrained in either extreme position thereof by a spring-biased detent 80 which includes a ball 81 biased by a spring 82 into one or the other of a pair of recesses 83 and 84 which are provided by the plunger in axially spaced relation therealong.

Considering the condition of the system when the ignition switch 10 is in the "off" position thereof shown in FIGURE 1, the positive side of the battery 19 is connected to the movable contact 61 of the switch unit 53 through the connector 18, arm 17, contact 50 and conductor 49. Since, however, the contact 61 is not in engagement with the terminal 56, the circuit through the energizing coil of the solenoid is interrupted and no current flows therethrough. This condition of the solenoid will be maintained until the movable contact of the ignition switch 10 is rotated to either the "on" or the "accessory" position, in which event the arm 17 will engage either the contact 68 or 67. Since these two contacts 68 and 67 are connected in common, the circuit condition will be the same.

When the ignition switch 10 is so positioned in either the "on" or "accessory" locations, the energizing coil of the solenoid will be actuated because the circuit therethrough will be completed from the battery 19, connector 18 and arm 17, contact 67 or 68 and the conductor 66, switch contact 64 and terminal 59, conductors 58 and 55, switch terminal 58 and 55, switch terminal 57 and contact 62, and conductor 63 to ground. Such energization of the solenoid will cause the plunger 69 thereof to reciprocate upwardly from the lowermost position thereof, illustrated in FIGURE 1, to the uppermost position shown in FIGURE 7.

Upward displacement of the solenoid plunger 69 will cause the bell crank 70 to pivot in a clockwise direction about the pin 72, whereupon the actuator arm 79 will be rotated upwardly into the position thereof shown in FIGURE 7, and the movable contacts 61, 62, 64 and 65 of the switch 52 correspondingly will be displaced upwardly into the alternate position thereof which is shown by broken lines in FIGURE 1. This movement of the switch contacts will interrupt the circuit through the energizing coil of the solenoid because the movable contact 64 of the switch unit 54 will be displaced from engagement with the terminal 59. Otherwise, the conductor 58 and terminal 60 will be grounded through the contact 65; and the conductor 55 and terminal 56 will be open because of the connection thereof through the movable contact 61 with the contact 50 of the ignition switch 10 (the arm 17 being displaced from such contact 50).

When the ignition switch 10 is returned to the "off" position thereof, the coil of the solenoid will be energized in the opposite direction because the conductor 55 will then be connected to the positive side of the battery 19 (which is a direct current source of power) through the terminal 56, contact 61, conductor 49, contact 50, arm 17, and connector 18. The opposite side of the solenoid coil is connected by the conductor 58 to ground through the terminal 60, contact 65, and conductor 63. Accordingly, the plunger 69 of the solenoid will be displaced downwardly from the uppermost position shown in FIGURE 7 to the lowermost position illustrated in FIGURE 8; and such displacement of the plunger will return the switch 53 to the condition thereof illustrated in FIGURE 1, in which event, the solenoid will be de-energized, as described hereinafter.

Referring to FIGURES 5, 6 and 7 in particular, it will be seen that the latch rod 73 for the engine compartment hood is also pivotally connected at an end thereof to a latch plate 85 slideably reciprocable within a slot or way 86 defined between a backing plate 87 and a generally U-shaped front plate 88 which is welded or otherwise rigidly secured thereto, as evident in FIGURE 5. The structural unit defined by the plates 87 and 88 is fixedly secured to the fire wall 77 along the forward side thereof by a plurality of cap screws 89. The fire wall 77, backing plate 87, and front plate 88 are provided with aligned apertures or openings therethrough which in the aggregate are denoted in FIGURE 5 with the numeral 90. The latch plate 85 is similarly provided with an opening 91 therethrough, generally aligned with the openings 90 but being elongated laterally and restricted in extent thereat as shown in FIGURE 6. Such restriction is denoted with the numeral 92. In the form shown, the opening 91 and its laterally extending restriction 92 together define a somewhat V-shaped configuration.

Extending through the openings 90 and 91 is an elongated hood latch lever 93, one end of which is connected to the usual and wholly conventional hood fastener (not shown) operative to hold the hood in its closed position until properly manipulated to effect release thereof. The lever at its opposite end is connected to a hand grip located within the interior of the automobile, such interior in FIGURES 2 and 5 being generally denoted with the numeral 94. The rod 93 may extend along a generally U-shaped guide and support structure 95 located within the engine compartment 78, and the lever is provided therealong with a stop element 96 fixedly located along the lever as by means of a set screw to prevent relative displacements therebetween. The stop 96 is located within the engine compartment and is dimensioned so as to be freely movable through the opening 90 and also through the major section of the opening 91. The restricted portion 92 of the opening 91 is not large enough to pass the stop 96 therethrough so that when such restricted section is in alignment with the stop, movement of the lever 93 toward the left, as viewed in FIGURE 5, is prevented.

The latch plate 85 is reciprocable within the slot or way 86, and in the position of the latch plate illustrated in FIGURES 5 and 6, the opening 91 is aligned with the stop 96 so as to freely pass the same therethrough. This position of the latch plate 85 corresponds to the position of the bell crank 70 shown in FIGURE 7, which position is enforced on the bell crank whenever the solenoid 51 is energized to reciprocate the plunger 69 thereof upwardly. Such actuation of the solenoid, as described hereinbefore, corresponds to the condition thereof when the ignition switch 10 is in either the "on" or "accessory" position.

When the ignition switch 10 is returned to the "off" position shown in FIGURE 1 and the solenoid 51 is thereby energized to displace the plunger 69 thereof downwardly, the bell crank 70 will be rotated in a counter-clockwise direction, as viewed in FIGURE 7, with the result that the latch rod 73 and latch plate 85 will be displaced tward the left, as viewed in FIGURE 6, whereupon the restricted portion 92 of the opening 91 will be located in alignment with the stop 96 with the result that movement of the lever 93 toward the left, as viewed in FIGURE 5, will be prevented. Therefore, the hood of the automobile will be latched in the closed position thereof whenever the ignition switch 10 is off (because the plunger 69 of the solenoid will be displaced downwardly); and the hood is free to be opened whenever the ignition switch 10 is in either the "on" or "accessory" positions (because the plunger 69 of the solenoid will be in the upper position thereof shown in FIGURE 7). The lever 93 may be biased toward its closed position by a spring 97, as shown in FIGURE 5, and a guide structure 98 may also be associated with the lever 93 and fire wall 77 within the interior of the passenger compartment 94 of the automobile. As indicated hereinbefore, the hood fastener mechanism, including the lever 93, may be completely conventional and, accordingly, the details thereof are not set forth.

Also controlled by the solenoid 51 is the mechanism that latches the gear shift lever in the "park" position thereof whenever the gear shift is moved into such position and the ignition switch 10 turned off. As shown in FIGURE 7, such mechanism includes a link 99 pivotally connected adjacent one end thereof to an arm of the bell crank 70 through pin and slot structure that accommodates the slight arcuate movement of the pin as the bell crank pivots about the pin 72. The link 99 at its other end is connected to a helical tension spring 100 that applies a resilient biasing force to the link 99, and, because of the connection of the link with the bell crank 70, usually to the bell crank 70 and solenoid plunger 69 tending to urge the plunger toward the lowermost position thereof shown in FIGURE 1. However, the slot by which the link is connected to the bell crank 70 is sufficiently long to enable the plunger 69 and bell crank 70 to move downwardly to their lowermost positions (corresponding to the FIGURE 1 illustration) without the necessity of the link 99 concurrently moving downwardly into its lowermost position since such movement thereof could be prevented if the gear shift lever 40 is not in its "park" position, as described hereinafter.

In this latter respect, the link 99 at its lower end is pivotally connected to an arm 101 of a latch crank 102 that is generally in the form of a bell crank and provides a second arm 103 having a latch finger or extension 104 adapted to enter a slot or opening 105 formed in the wall of a hollow tube or cylinder 106. Slidably mounted within the hollow interior 107 of the cylinder 106 is a piston or plunger 108 that at its lower end is pivotally connected to a bifurcated coupling 109 that forms a part of the gear shift lever 40. Accordingly, the cylinder or plunger 108 reciprocates within the hollow interior 107 of the cylinder whenever the condition of the transmission is altered by manipulation of the gear shift lever 40.

Whenever the gear shift lever 40 is displaced into the position thereof corresponding to the "park" condition of the transmission, the piston 108 will be so located within the cylinder that a recess 110 formed along the piston will be aligned with the opening 105 in the cylinder 106 and, therefore, will be aligned with the latch finger 104 so as to receive the same therein. In order to effect such insertion of the latch finger, the latch crank 102 is supported for pivotal movement about a pin 111 oriented and disposed so that the finger 104 is aligned with the opening 105 and can move therethrough and into the recess 110, provided that the recess is aligned with the opening.

As explained heretofore, the pin and slot connection defined between the bell crank 70 and link 99 enables the bell crank 70 to swing in a counter-clockwise direction about the pivot pin 72 to permit the plunger 69 of the solenoid to be displaced downwardly until the recess 83 therealong receives the ball 81 of the detent therein, even though the recess 110 of the cylinder 108 is not aligned with the slot 105 (that is to say, the gear shift lever has not been displaced into the "park" position prior to the ignition switch 10 being turned off). Should this condition prevail, the latch finger 104 will be resiliently urged into engagement with the wall of the cylinder 108 by the biasing force of the spring 100, and such spring force will displace the latch finger 104 into the recess 110 when the gear shift lever is displaced into its "park" position. Such interengagement of the latch finger with the recess constrains the gear shift lever 40 against displacement from its "park" position so long as the ignition switch 10 remains off.

It will be noted in FIGURE 7 that the aforementioned switch 33 has an actuator 112 axially aligned with the piston 108. The piston is equipped at its upper end with an adjustable abutment 113 which may be in the form of a set screw, as shown; and such abutment is axially aligned with the actuator 112. The positioning of the abutment is such that it will engage and displace the actuator 112 only when the gear shift lever 40 is moved completely in the "park" position thereof. Such displacement of the actuator 112 will move the contact 35 of the switch 33 away from the fixed terminal 37 thereby interrupting the indicia circuit through the switch.

As shown in FIGURE 2 (which it should be emphasized is illustrative only and in no sense is intended to indicate the orientation and relative disposition of the hood latch, parking brake, ignition switch, etc.), the visual indicator 30 may be mounted upon the dash 114 of the automobile. The latch lever 93 also extends through the dashboard 114 and is provided with a nob or hand grip 115 to facilitate manual manipulation. The parking brake actuator 39 includes the usual bar or rod 116 which is movable and is provided with a handle 117 that may project beyond the dashboard 114 into the compartment 94, as shown. The aforementioned switch 32 is located so that the actuator 118 thereof is displaced whenever the parking brake is set (the rod 116 displaced toward the left as viewed in FIGURE 2) and, for this purpose, the rod 116 may be provided therealong with an abutment element 119 which can be adjustable so as to assure actuation of the switch 32 only when the parking brake actuator is fully extended.

In the customary manner, the ignition switch 10 is associated with the dashboard 114 and projects slightly therethrough so that the key 20 is readily insertable into the lock section of the switch. With respect to the construction and function of the lock components of the switch, they may be essentially conventional and comprise the usual stator element 120 and rotor element 121. These elements can be releasably interconnected by a plurality of spring biased pins in the usual manner so that when the key 20 is in position, such pins are respectively displaced into locations that permit the rotor element 121 to be angularly displaced with respect to the stator element 120. This arrangement is shown in FIGURE 4, and it may be noted that the compression springs 122 and 123 which respectively bear against the pin structures 124 and 125 are selected to provide a somewhat greater biasing force than otherwise, so as to increase the resilient frictional force tending to constrain the key 20 within the lock. The reason therefor is to counterbalance or off-set the spring force tending to displace the key outwardly from the lock as a consequence of the inclusion of the aforementioned switch 26 in the ignition switch 10.

More particularly, the ignition switch 10, as seen in FIGURE 4, has an elongated plunger 126 extending therethrough which is formed of an insulated material and is adapted to be engaged by the key 20, as shown generally at 127. The plunger 126 is axially displaceable and is provided therealong with a flange or stop 128 formed of an insulating material that defines a seat for one end of a helical spring 129 which, at its opposite end, seats against a stop 130, also formed of insulating material, which is constrained against movement toward the right, as viewed in FIGURE 4, by abutment thereof with a somewhat U-shaped element that forms the aforementioned terminal 25 of the switch 26. The other terminal 27 of the switch 26 is shown in spaced relation with the terminal 25, and an electrical connection is adapted to be formed thereacross by the movable contact 31 which is in the form of an annular disc coaxially mounted upon the plunger 126.

The stop 128 is constrained upon the plunger 26 so that relative movement therebetween is prevented, and since the spring 129 is a compression spring, it biases the stop 128 and plunger 126 toward the left and into a position (not shown) in which the contact 31 is displaced from the terminals 25 and 27 so that the circuit therebetween is interrupted. When the key 20 is inserted into the lock, the tip of the key engages the inner end of the plunger 126 and displaces the same toward the right to cause the contact 31 to close against the terminals 25 and 27. It will be appreciated that the contact 31 may be floatingly supported by the spring 129 so that it will be resiliently urged thereby into engagement with the terminals 25 and 27 and close tolerances need not be observed, then, in determining the length of the plunger 126, length of the key 20, and associated dimensions.

Except for the structural features hereinbefore described, the ignition switch 10 is essentially conventional and, therefore, it is unnecessary to include further descriptive details. Accordingly, and in the usual manner, the various electric conductors are connected to the switch 10 adjacent the innermost wall thereof, as shown in FIGURE 3 and as designated generally with the numeral 131. Such inner end of the switch is disposed between the dashboard 114 and fire wall 77, and while such location makes the connections somewhat inaccessible, they can be reached, and upon occasion the ignition circuit 13 can be energized by "jumper" wires. This, of course, is a means by which unauthorized use of an automabile is effected.

In the present instance, such manipulation of the ignition conductors is obviated by enclosing the same in a protective encasement structure 132 which extends substantially between the fire wall 77 and dashboard 114. In the form shown, the encasement structure 132 is a rigid component which at one end may be firmly attached to the housing of the switch 10 by any suitable means such as the collar 133 and cap screws 134. As its opposite end, the encasement structure is provided with a laterally extending annular flange 135 that seats within an opening provided therefor in the fire wall 77 and is fixedly clamped thereto by a pair of annular clamping rings 136 and 137 respectively disposed on opposite sides of the fire wall 77 in facing abutment with the flange 135. A plurality of threaded stud and nut structures 138 extend through the clamping rings and fire wall and lock the clamping rings in the position shown. The studs are welded to the inner clamping ring 136 so that they cannot be manipulted from within the passenger compartment of the automobile.

Most desirably, the encasement structure 132 is casehardened steel or is otherwise formed of a relatively hard material that would make it extremely difficult to cut or otherwise break. Thus, when the automobile has been properly locked, the engine compartment thereof cannot be entered readily, which protects the ignition circuit, and the encasement structure 132 cannot be readily entered, which further protects the ignition circuit. Accordingly, unauthorized energization of the ignition system is made exceedingly difficult.

It will be evident from the foregoing that an automobile embodying the invention is for the most part cenventional and, as such is operated in the usual and ordinary manner. Thus, upon insertion of the ignition key 20 into the lock section of the ignition switch 10, such switch can be rotated in one direction to its "on" position and slightly therepast if the starter of the automobile is actuated by manipulation of the ignition key. Similarly, the various accessories of the automobile may be operated without the engine runing by simply rotating the ignition key in the opposite angular direction and into the "accessory" position. Furthermore, there is no difference in the manner in which the parking brake and gear shift levers are manipulated or in the manner in which the running lights are controlled. Access into the engine compartment is obtained by releasing the hood in the usual manner with the single provision that the ignition switch must be in either the "on" or "accessory" position thereof before such release can be effected.

Whenever the automobile is parked, the driver is signalled by both audible and visual indicia if one or more of a certain group of conditions have not been satisfied, which conditions are intended to prevent a runaway automobile and to serve as a significant impediment to the unauthorized use of the automobile. In the specific embodiment being considered herein, such conditions include actuation of the parking brake, displacement of the gear shift lever into its "park" position, interruption of the running light circuit, and removal of the key from the ignition switch. Additionally, the gear shift lever will be latched automatically in such "park" position thereof, and the hood will be locked in its closed position because manipulation of the release mechanism thereof will be prevented.

As illustrated most clearly in FIGURE 1, the switches 26, 32 and 33 are connected in parallel and, accordingly, the buzzer 29 and light 30 will be energized when any one of the switches is closed and the ignition switch 10 is in the "off" position illustrated. The switches 26, 32 and 33 are respectively associated with the ignition key 20, parking brake actuator 39 and gear shift lever 40, and such switches will be closed, respectively, until the key 20 is removed from the lock section of the ignition switch, the parking brake actuator 39 is displaced into the "park" position thereof, and the gear shift lever 40 is displaced into its "park" position. Similarly, the switch unit 44 of the light switch 43 is in functional parallelism with the switches 26, 32 and 33, and the indicia devices will be energized whenever the lights are on (i.e., the switch 43 is closed) and the ignition switch 10 in its "off" position.

The solenoid 51, because of the control circuit therefor defined by the switch units 53 and 54, is displaced downwardly into the "lock" position illustrated in FIGURE 1 whenever the ignition switch 10 is rotated into its "off" position. In this "lock" position of the solenoid, the plunger 69 thereof will be frictionally retained in its lowermost position because of the insertion of the detent ball 81 into the recess 83. Since the bell crank 70 will have been rotated in a counter-clockwise direction, as viewed in FIGURE 7, into its lock position, the finger 104 will enter the recess 110 when the gear shift lever 40 is displaced into its "park" position thereby preventing release of the transmission until the ignition switch is again turned either to the "on" or "accessory" positions thereof. Similarly, such movement of the bell crank 70 will displace the latch plate 85 toward the left, as viewed in FIGURE 6, to position the restricted section 92 of the opening 91 behind the stop element 96, whereupon release of the hood of the automobile is prevented until the ignition switch is turned either to the "on" or "accessory" positions.

When the ignition switch 10 is moved into one or the other of such positions, the solenoid 51 will be energized in the opposite direction to displace the plunger 69 upwardly into the position illustrated in FIGURE 7, and the plunger will tend to remain in such position because the ball 81 of the detent will be biased within the recess 84. Such upward displacement of the plunger 69 will withdraw the latch finger 104 from the recess 110 and will also displace the latch plate 85 toward the right to permit the stop 96 to move through the openings 90 and 91.

While in the foregoing specification an embodiment of the invention has been described in considerable detail for purposes of making a complete disclosure thereof, it will be apparent to those skilled in the art that numerous changes may be made in such details without departing from the spirit and principles of the invention.

What is claimed is:

1. The combination of an anti car-theft system with an automotive vehicle or the like having a lock-equipped ignition switch provided with off, on and accessory positions and being adapted to be manipulated between such positions by a key inserted into such lock and having also a transmission and shift lever therefor selectively movable between park and various drive positions, said anti car-theft system comprising: a signal device; a key switch arranged with said ignition switch so as to be displaced between the open and closed positions thereof by insertion and removal of such key from said lock; a shift-lever switch arranged with said shift lever so as to be displaced between open and closed positions thereof by movement of said shift lever into and out of the park position thereof; and a circuit including said key switch, shift-lever switch, signal device and ignition switch and being completed to energize said signal device whenever the ignition switch is in its off position and either such key is within said lock or said shift lever is not in said park position or both, and being interrupted whenever said ignition switch is in either the on or accessory positions thereof or whenever said key is removed from said lock and said shift lever is in the park position thereof.

2. The combination of claim 1 in which said automotive vehicle further has a parking brake and actuator therefor adapted to be moved between park and release positions; a parking-brake switch arranged with said parking brake actuator so as to be displaced between open and closed positions thereof by movement of said actuator into and out of the park position; said circuit also including said parking-brake switch and also being completed to energize said signal device whenever the ignition switch is in its off position and either such key is within said lock or said parking brake actuator is not in the park position or both, and also being interrupted whenever said ignition switch is in either the on or accessory positions thereof or whenever said key is removed from said lock and said parking brake actuator is in the park position thereof.

3. The combination of claim 1 in which said automotive vehicle further has running lights and a control switch therefor selectively movable between on and off positions; a light-protection switch arranged with said control switch so as to be displaced between its open and closed positions whenever said control switch is moved into and out of the on position thereof; said circuit also including said light-protection switch and also being completed to energize said signal device whenever said ignition switch is in its off position and such key is within said lock or said light control switch is on or both, and also being interrupted whenever said ignition switch is in either the on or accessory positons thereof or whenever said key is removed from said lock and said light control switch is in its off position.

4. The combination of an anti car-theft system with an automotive vehicle or the like having a lock-equipped ignition system provided with off, on and accessory positions and being adapted to be manipulated between such positions by a key inserted into such lock and having also a transmission and shift lever therefor selectively movable between park and various drive positions, a parking brake and actuator therefor adapted to be moved between park and release positions, and running lights and a control switch therefor selectively movable between on and off positions, said anti car-theft system comprising: a signal device; a key switch arranged with said ignition switch so as to be displaced between open and closed positions thereof by insertion and removal of such key from said lock; a shift-lever switch arranged with said shift lever so as to be displaced between open and closed positions by movement of said shift lever into and out of the park position thereof; a parking-brake switch arranged with said parking brake actuator so as to be displaced between open and closed positions by movement of said actuator into and out of the park position; a light-protection switch arranged with said control switch so as to be displaced between its open and closed positions whenever said control switch is moved into and out of the on position thereof; and a circuit including said key switch, shift-lever switch, parking-brake switch, light-protection switch, signal device and ignition switch and being completed to energize said signal device whenever said ignition switch is in its off position and such key is within said lock or said shift lever is not in its park position or said parking brake actuator is not in its parking position or said light control switch is on, and being interrupted whenever said ignition switch is in either the on or accessory postions thereof or whenever said key is removed from said lock and said shift lever is in its park position and said parking brake actuator is in its park position and said light control switch is in its off position.

5. The combination of claim 4 in which a pair of signal devices are arranged in said circuit, one of said devices providing an audible signal and the other providing a visual signal.

6. The combination of claim 5 in which said devices are connected in series.

7. The combination of claim 4 in which said lock-equipped ignition switch is provided with a plunger axially displaceable along the path traversed by such key in moving into and out of said lock, said plunger being connected with the movable contact of said key switch and being biased in a direction to interrupt said circuit, said plunger being displaced by insertion of such key into said lock to cause said key switch to close said circuit.

8. The combination of claim 7 in which an auxiliary spring force is provided by said lock to compensate for the biasing force applied to said plunger so as to prevent ejection thereby of such key from said lock.

9. The combination of claim 4 in which said automotive vehicle is equipped with a fire wall and a dashboard spaced therefrom, said ignition switch being located adjacent said dashboard and having a plurality of electrical conductors connected thereto including conductors for the ignition circuit of the automotive vehicle, and further comprising a protective casing enclosing said conductors and extending intermediate said fire wall and dashboard.

10. The combination of claim 9 in which said protective casing is a rigid component.

11. The combination of an anti car-theft system with an automotive vehicle or the like having an ignition switch provided with off, on and accessory positions and having also a transmission and shift lever therefor selectively movable between park and various drive positions, said anti car-theft system comprising: a latch mechanism arranged with said shift lever for interlocking connection therewith whenever said ignition switch is in its off position and said shift lever is displaced into the park position thereof, electric motor means controlling said latch mechanism, and a circuit including said ignition switch and motor means and being completed whenever said ignition switch is moved into the off position thereof to energize said motor means for conditioning said latch mechanism to interlockingly engage said shift lever and thereby prevent displacement thereof from its park position.

12. The combination of claim 11 in which said ignition switch is equipped with a lock and is manipulatable between the off, on and accesory positions thereof by a key inserted into such lock.

13. The combination of claim 11 in which said motor means comprises a solenoid having a reciprocable plunger and in which said circuit also includes solenoid control switches operative to energize said solenoid to effect displacement of the plunger thereof in one direction for conditioning said latch mechanism to interlockingly engage said shift lever whenever said ignition switch is moved into the off position thereof and to energize said solenoid in a reverse sense to effect displacement of said plunger in the opposite direction for making said latch mechanism ineffective to interlockingly engage said shift lever.

14. The combination of claim 11 in which the aforesaid automotive vehicle includes a hood and releasable fastener mechanism therefor, and in which said anti car-theft system further comprises locking structure operatively connected with said fastener mechanism for selectively preventing release thereof, said locking structure being controlled by said motor means so that release of said fastener mechanism is prevented whenever said ignition switch is moved into the off position thereof.

15. The combination of claim 11 and further comprising a signal device and a shift-lever switch both of which are connected in said circuit, said signal device being energized by said circuit whenever said igniton swtch is in the off position thereof and said shift lever is not in said park position or both, and said signal device being de-energized by said circuit whenever said ignition switch is in either the on or accesory positions thereof or whenever said ignition switch is in its off postion and said shift lever is n the park postion thereof.

16. The combination of an anti car-theft system with an automotive vehicle or the like having a lock-equipped ignition system provided with off, on and accessory positions and being adapted to be manipulated between such positions by a key inserted into such lock and having also a transmission and shift lever therefore selectively movable between park and various drive positions, a parking brake and actuator therefor adapted to be moved between park and release positions, and running lights and a control switch therefor selectively movable between on and off positions, said anti-car-theft system comprising: a signal device; a key switch arranged with said ignition switch so as to be displaced between open and closed positions thereof by insertion and removal of such key from said lock; a shift-lever switch arranged with said shift lever so as to be displaced between open and closed positions by movement of said shift lever into and out of the park position thereof; a parking-brake switch arranged with said parking brake actuator so as to be displaced between open and closed positions by movement of said actuator into and out of the park position; a light-protection switch arranged with said control switch so as to be displaced between its open and closed positions whenever said control switch is moved into and out of the on position thereof; a latch mechanism arranged with said shift lever for interlocking connection therewith whenever said ignition switch is in its off position and said shift lever is dsplaced into the park position thereof, and electric motor means controlling said latch mechanism; and a circuit including said key switch, shift-lever switch, parking-brake switch, light-protection switch, signal device, motor means and ignition switch and being completed whenever said ignition switch is moved into the off position thereof to energize said motor means for conditioning said latch mechanism to interlockingly engage said shift lever and thereby prevent displacement thereof from its park position and to energize said signal device whenever such key is within said lock or said shift lever is not in its park position or said parking brake actuator is not in its parking position or said light control switch is on, and being interrupted whenever said ignition switch is in either the on or accessory positions thereof or whenever said key is removed from said lock and said shift lever is in its park position and said parking brake actuator is in its park position and said light control switch is in its off position.

17. The combination of claim 16 in which a pair of signal devices are arranged in said circuit in series connection, one of said devices providing an audible signal and the other providing a visual signal.

18. The combination of claim 17 in which said lock-equipped ignition switch is provided with a plunger axially displaceable along the path traversed by such key in moving into and out of said lock, said plunger being connected with the movable contact of said key switch and being biased in a direction to interrupt said circuit, said plunger being displaced by insertion of such key into said lock to cause said key switch to close said circuit, and in which an auxiliary spring force is provided by said lock to compensate for the biasing force applied to said plunger so as to prevent ejection thereby of such key from said lock.

References Cited
UNITED STATES PATENTS

| | | | |
|---|---|---|---|
| 2,215,162 | 9/1940 | Scott | 340—52 |
| 2,519,940 | 8/1950 | Smith et al. | |
| 2,634,400 | 4/1953 | Sweet | 340—69 |
| 2,756,408 | 7/1956 | McKaig | 340—52 |
| 2,799,843 | 7/1957 | Savino | 340—52 |
| 3,072,884 | 1/1963 | Hughes | 340—52 |

JOHN W. CALDWELL, *Primary Examiner.*

A. WARING, *Assistant Examiner.*